(12) United States Patent
Murdock

(10) Patent No.: US 6,394,538 B1
(45) Date of Patent: May 28, 2002

(54) RETAINER FOR OVERHEAD SYSTEM WIRING HARNESS

(75) Inventor: Jay Allan Murdock, Redford, MI (US)

(73) Assignee: Lear Corporation, Southfield, MI (US)

( * ) Notice: Subject to any disclaimer, the term of this patent is extended or adjusted under 35 U.S.C. 154(b) by 12 days.

(21) Appl. No.: 09/751,131

(22) Filed: Dec. 29, 2000

(51) Int. Cl.$^7$ .............................................. B60R 13/02
(52) U.S. Cl. ......................................... 296/214; 439/34
(58) Field of Search ........................ 296/214; 174/68.1, 174/72 A, 79, 97; 439/34

(56) References Cited

U.S. PATENT DOCUMENTS

| | | |
|---|---|---|
| 4,874,908 A | 10/1989 | Johansson |
| 5,016,934 A | 5/1991 | Pelz |
| 5,105,521 A | 4/1992 | Dowd et al. |
| 5,269,060 A | 12/1993 | Dowd et al. |
| 5,309,634 A | 5/1994 | Van Order et al. |
| 5,455,716 A | 10/1995 | Suman et al. |
| 5,484,186 A | 1/1996 | Van Order et al. |
| 5,712,764 A | 1/1998 | Baker et al. |
| 5,744,218 A | 4/1998 | Barnes |
| 5,885,091 A | 3/1999 | Belanger, Jr. |
| 5,887,939 A | 3/1999 | Yamaguchi et al. |
| 6,000,951 A | 12/1999 | Hansen et al. |
| 6,120,091 A * | 9/2000 | Reich et al. ................. 296/214 |
| 6,126,228 A * | 10/2000 | Davis, Jr. et al. ....... 296/214 X |
| 6,273,499 B1 * | 8/2001 | Guyon ........................ 296/214 |

\* cited by examiner

Primary Examiner—Joseph D. Pape
(74) Attorney, Agent, or Firm—Brooks & Kushman P.C.

(57) ABSTRACT

A motor vehicle overhead system adapted to accept a wiring harness having a minimum cross-sectional dimension. The overhead system comprises an energy management block having a routing channel, and a plurality of retainers disposed in the routing channel. The retainers extend over the routing channel to define a gap having a gap dimension less than the minimum cross-sectional dimension of the wiring harness, such that the wiring harness can be forced into the retainment channel and retained therein.

14 Claims, 3 Drawing Sheets

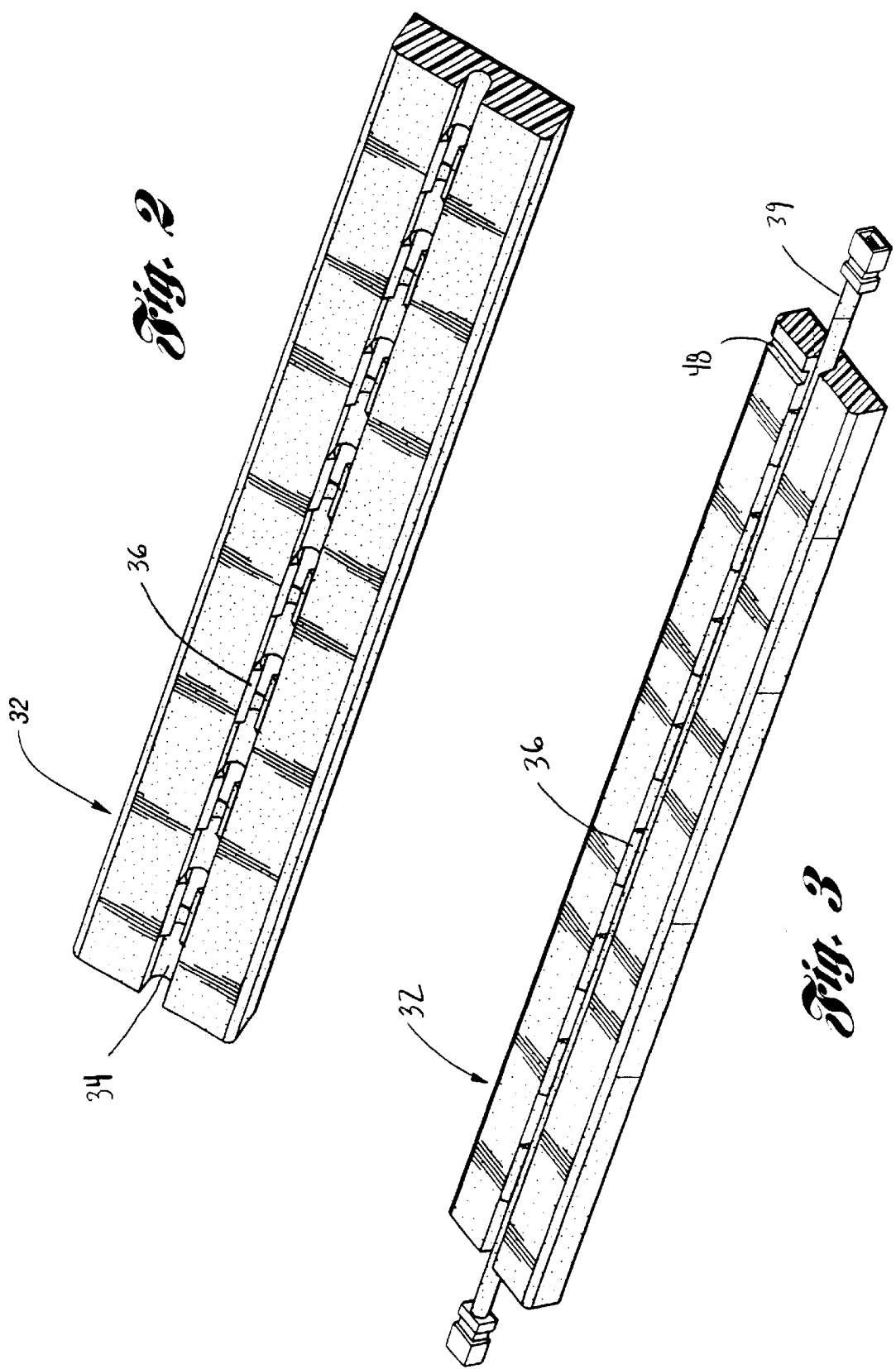

RETAINER FOR OVERHEAD SYSTEM WIRING HARNESS

TECHNICAL FIELD

This invention relates to headliners for motor vehicles.

BACKGROUND ART

Headliners for motor vehicles are mounted inside the passenger compartment and against the sheet metal roof of the vehicle to provide an aesthetic covering for the sheet metal. Such headliners may be provided with dome lights, convenience lights, sun visor vanity lights, air circulation fans, or other electrical devices, in order to form an overhead system. In order to route electrical power to these devices, the headliner must be provided with a wiring harness.

The wiring harness is conventionally located in a channel on the back side of the headliner, and then secured in the channel by means of tape or an adhesive. U.S. Pat. No. 5,105,521, for example, shows a headliner in which an adhesive is placed over the wire bundle to secure the wire bundle within a channel.

SUMMARY OF THE INVENTION

This invention is an improved motor vehicle overhead system. The overhead system comprises a headliner adapted to accept a wiring harness having a minimum cross-sectional dimension, and an energy management block. The energy management block has a routing channel and a plurality of retainers. The retainers are disposed in the routing channel, and extend over the routing channel to define a gap having a gap dimension less than a minimum cross-sectional dimension of the wiring harness.

Accordingly, it is an object of the present invention to provide an improved overhead system of the type described above which is less expensive to produce in terms of materials.

Another object of the present invention is to provide an improved overhead system of the type described above which is less expensive to produce in terms of labor.

These and other objects, features, and advantages of the present invention are readily apparent from the following detailed description of the best modes for carrying out the invention when taken in conjunction with the accompanying drawings.

BRIEF DESCRIPTION OF THE DRAWINGS

FIG. 2 is a perspective view of an energy management block of the overhead system according to the present invention without a wiring harness;

FIG. 3 is a perspective view of an alternative embodiment of the energy management block including the wiring harness;

BEST MODES FOR CARRYING OUT THE INVENTION

Figure 1:
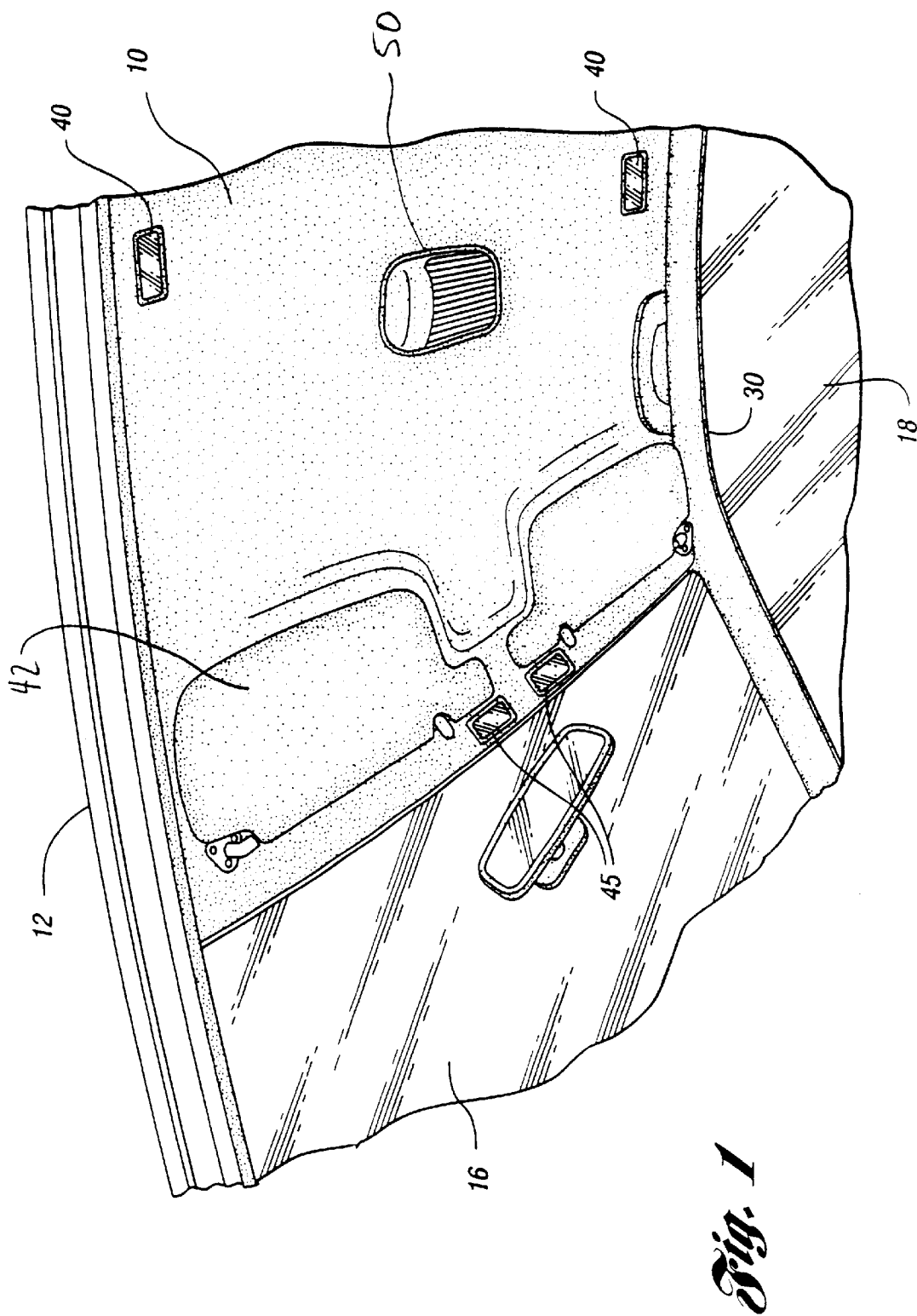
FIG. 1 is perspective view of the interior of a motor vehicle including an overhead system.
Figure 4:
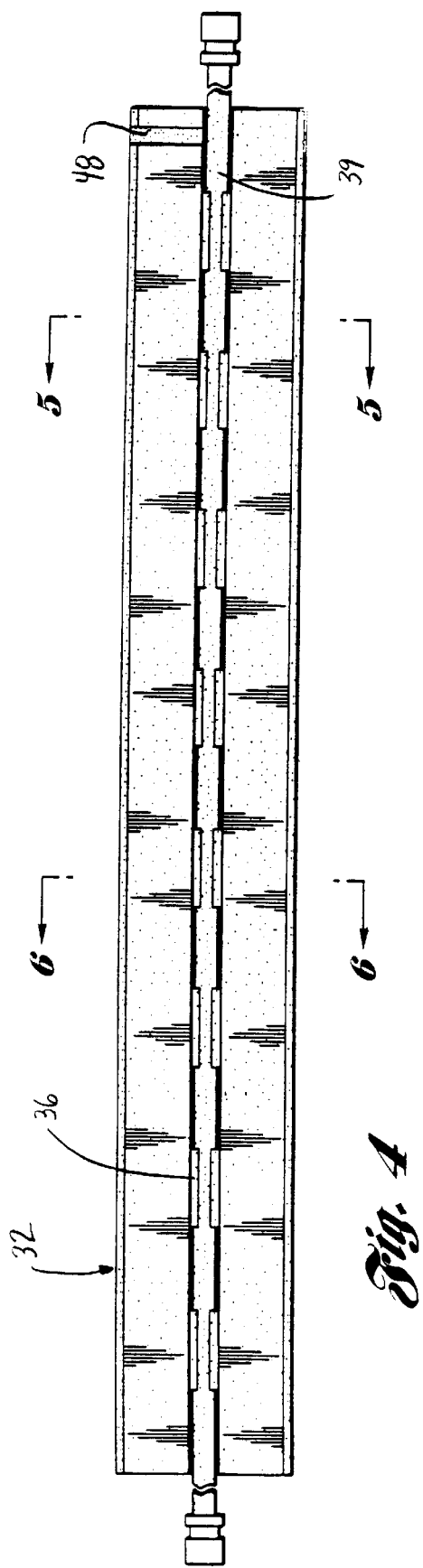
FIG. 4 is a top view of the energy management block shown in FIG. 3.
Figure 6:
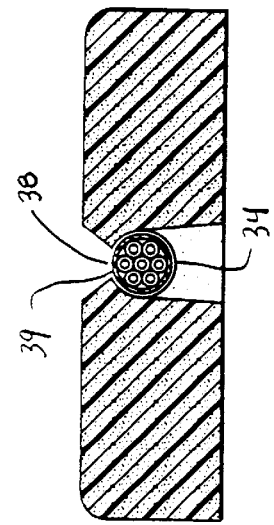
FIG. 6 is a cross-sectional view taken along line 6—6 in FIG. 4.
Figure 5:
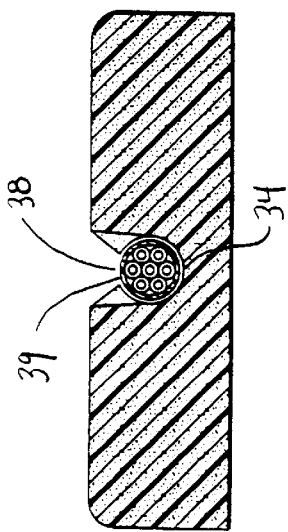
FIG. 5 is a cross-sectional view taken along line 5—5 in FIG. 4.

With reference to the drawings, the preferred embodiments of the present invention will be described. FIG. 1 shows an overhead system 10 according to the present invention for use in the interior of a motor vehicle 12. As is conventional, the overhead system 10 includes a headliner which covers the sheet metal roof of the vehicle rearwardly from the front windshield 16 and substantially between the side windows 18. As is conventional, the non-show side of the overhead system 10 includes a energy management block normally located in the area 30.

FIGS. 2–6 show a section 32 of an energy management block according to the present invention. The energy management block 32 comprises a material such as foam, preferably expanded polypropylene. The energy management block 32 has a routing channel 34 formed therein. A plurality of retainers 36 are disposed in the routing channel 34, preferably at evenly spaced intervals. As discussed below, the retainers 36 are preferably integrally molded with the energy management block 32.

The retainers 36 extend over the routing channel 34 to define a gap 38 having a certain gap dimension. In particular, the gap dimension is designed to be slightly less than a minimum cross-sectional dimension of a wiring harness 39 that will be located within the channel 34. In this way, the wiring harness 39 can be forced, manually or otherwise, into the routing channel 34 and retained therein. Thus the routing channel 34 serves not only to locate the wiring harness 39, but also to retain it proximate the overhead system 10.

FIGS. 3–6 show the wiring harness 39 in place in the routing channel 34. The wiring harness 39 supplies electrical power, as is well known, from a source to a variety of electrical devices in the overhead system 10 such as side convenience lights 40, vanity lights in sun visors 42, or front convenience lights 45. In many cases, the wiring harness 39 has a generally circular cross-section, and thus the routing channel 34 is preferably configured with a generally circular cross-section to closely receive the wiring harness. It should be appreciated, however, that the routing channel 34 can be formed with generally square, rectangular, V-shaped or other cross-sectional designs. Additionally, the energy management block 32 may be provided with one or more lateral channels 48 in order to route the wiring harness 39 to a more centrally located electrical device such as dome light 50 shown in FIG. 1.

The energy management block 32 may be formed in a conventional molding operation. In particular, the routing channel 34, including the retainers 36, is formed using a straight die pull. In this regard, it may be noted that the area of the energy management block below the retainers 36 is vacant, i.e. the channel 34 is open to the headliner in the area of the retainers. It should also be appreciated that the routing channel 34 can be formed in a post-molding operation, rather than integrally formed in the molding operation.

Once the routing channel is formed in the energy management block 32, the energy management block may be joined to the overhead system by any conventional method. After the energy management block 32 is joined to the overhead system, the wiring harness 39 is laid along the tops of the retainers 36 in the wire routing channel. The wiring harness is then pushed down through the retainers into the channel. Because the gap 38 between the teeth of the retainers is smaller that the minimum dimension of the wiring harness 39, the harness is retained in the channel 34.

The present invention reduces or eliminates the need for glue or tape to hold the wiring harness down, which results in a savings in material. Additionally, the easier wire routing provided by the present invention shortens the time it takes to assemble the wiring harness to the overhead system.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A motor vehicle overhead system including a headliner adapted to accept a wiring harness having a minimum cross-sectional dimension, the overhead system comprising:

an energy management block having a routing channel; and a plurality of retainers disposed in the routing channel, the retainers extending over the routing channel to define a gap having a gap dimension less than the minimum cross-sectional dimension of the wiring harness, such that the wiring harness can be forced into the routing channel and retained therein.

2. The overhead system of claim 1 wherein the retainers are integral with the energy management block.

3. The overhead system of claim 1 wherein the routing channel has a generally circular cross-section.

4. The overhead system of claim 1 wherein the energy management block comprises foam.

5. The overhead system of claim 1 wherein the energy management block comprises expanded polypropylene.

6. A motor vehicle overhead system comprising:

a headliner adapted to accept a wiring harness having a minimum cross-sectional dimension; and an energy management block having a routing channel and a plurality of integral retainers, the retainers extending over the routing channel to define a gap having a gap dimension less than the minimum cross-sectional dimension of the wiring harness, such that the wiring harness can be forced into the routing channel and retained therein.

7. The overhead system of claim 6 wherein the routing channel has a generally circular cross-section.

8. The overhead system of claim 6 wherein the energy management block comprises foam.

9. The overhead system of claim 6 wherein the energy management block comprises expanded polypropylene.

10. A motor vehicle overhead system adapted to accept a wiring harness having a minimum cross-sectional dimension, the overhead system comprising:

an energy management block comprising foam, the energy management block having a routing channel and;

a plurality of integral retainers, the retainers extending over the routing channel to define a gap having a gap dimension less than the minimum cross-sectional dimension of the wiring harness, such that the wiring harness can be forced into the routing channel and retained therein.

11. The overhead system of claim 10 wherein the routing channel has a generally circular cross-section.

12. The overhead system of claim 10 wherein the foam comprises expanded polypropylene.

13. A method of making a motor vehicle overhead system adapted to accept a wiring harness having a minimum cross-sectional dimension, the method comprising:

providing an energy management block having a routing channel; and disposing a plurality of retainers in the routing channel, the retainers extending over the routing channel to define a gap having a gap dimension less than the minimum cross-sectional dimension of the wiring harness.

14. The method of claim 13 further comprising locating the wiring harness in the routing channel.

* * * * *